(12) United States Patent
McPherson et al.

(10) Patent No.: US 6,802,570 B2
(45) Date of Patent: Oct. 12, 2004

(54) ORIENTED ROLLER BUSHING FOR BOAT TRAILER

(75) Inventors: Gary M. McPherson, Ivyland, PA (US); Mark R. Rossney, Glen Mills, PA (US)

(73) Assignee: Load Rite Trailers, Inc., Fairless Hills, PA (US)

( * ) Notice: Subject to any disclaimer, the term of this patent is extended or adjusted under 35 U.S.C. 154(b) by 3 days.

(21) Appl. No.: 10/256,735

(22) Filed: Sep. 27, 2002

(65) Prior Publication Data

US 2004/0061373 A1 Apr. 1, 2004

(51) Int. Cl.$^7$ .................... B60B 23/00; B60B 27/02; B60B 27/06
(52) U.S. Cl. .................... 301/111.04; 301/111.07; 301/122
(58) Field of Search ............... 301/5.305, 8, 111.01, 301/112–113, 120, 122, 111.03, 111.07, 111.04, 37.26, 111.06, 121, 118–119

(56) References Cited

U.S. PATENT DOCUMENTS

| | | | | |
|---|---|---|---|---|
| 219,413 A | * | 9/1879 | Sawdon et al. | 301/122 |
| 966,331 A | * | 8/1910 | Hartung | 301/122 |
| 1,011,334 A | * | 12/1911 | Ewald | 301/111.03 |
| 2,634,168 A | * | 4/1953 | Maxam | 301/122 |
| 2,717,807 A | * | 9/1955 | Kapp | 301/1 |
| 2,940,781 A | * | 9/1960 | Erikson | 301/111.04 |
| 4,196,502 A | * | 4/1980 | Johnson | 492/16 |
| 4,464,092 A | * | 8/1984 | Chambers et al. | 414/534 |
| 4,603,459 A | * | 8/1986 | Buchanan | 492/15 |
| 4,881,515 A | * | 11/1989 | Simo | 124/44.5 |
| 5,024,312 A | * | 6/1991 | Godbersen | 193/37 |
| 5,058,959 A | * | 10/1991 | Miles et al. | 301/108.2 |
| 5,277,480 A | * | 1/1994 | Chiu | 301/111.07 |
| 5,358,314 A | * | 10/1994 | Spadotto | 301/111.01 |
| 5,884,982 A | * | 3/1999 | Yemini | 301/111.03 |
| 5,957,544 A | * | 9/1999 | Hu | 301/111.01 |
| 6,361,121 B1 | * | 3/2002 | Morris | 301/112 |
| 6,561,593 B2 | * | 5/2003 | Godwin | 301/111.04 |

* cited by examiner

Primary Examiner—Russell D. Stormer
Assistant Examiner—Jason R. Bellinger
(74) Attorney, Agent, or Firm—Paul & Paul

(57) ABSTRACT

A boat trailer roller wheel mounting system for carrying an insignia in a predetermined orientation is provided. Included is a closed-ended wheel bushing which carries indexing for mating with an indexed wheel support arm in a predetermined, rotational orientation. The roller wheel turns on and is held by the indexed bushing. A quick release retainer ring fixes the bushing to the support arm and acts as an inboard longitudinal movement stop for the wheel. The bushing indexing on the support arm transfers the rotational thrust created on bushing, due to the rotation of the wheel under a load, directly to the support arm and therefore eliminates this rotational thrust from acting upon the retainer ring. An end cap is formed at the closed outer end of the bushing and has an annular projection surface extending beyond the bushing surface to provide a longitudinal thrust surface against which the wheel hub can operate. The positive orientation of the bushing to the support arm establishes a predetermined orientation of the end cap. This permits an insignia placed on the outside face of the end cap to always have a predetermined orientation, when the mounting system is assembled.

18 Claims, 6 Drawing Sheets

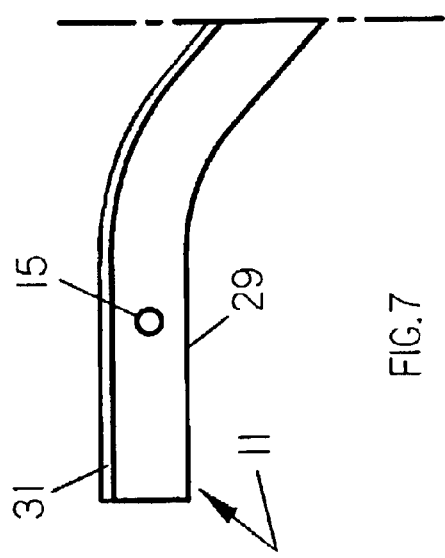
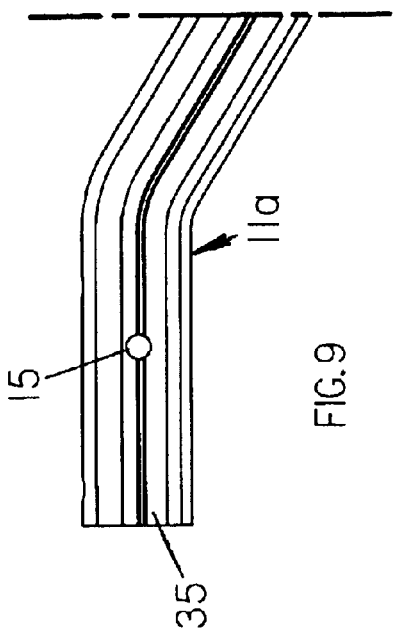
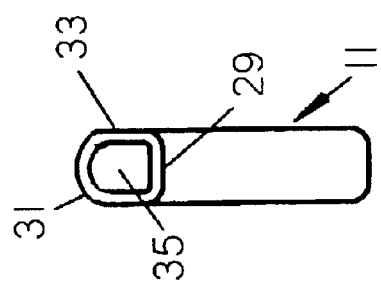
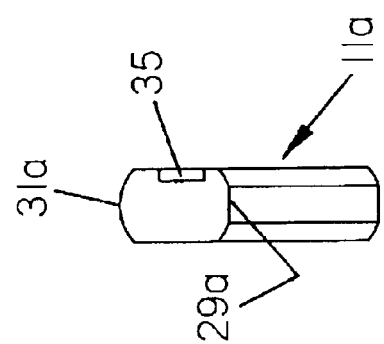

ORIENTED ROLLER BUSHING FOR BOAT TRAILER

BACKGROUND OF THE INVENTION

The present invention is directed to pleasure boat trailers, and in particular to wheel assemblies for supporting a boat hull on a trailer.

Hull engaging roller systems are useful in conforming to hull orientation and thereby facilitating the loading and unloading of a boat on a trailer. It is well recognized that the boat supporting members of a trailer structure should conform to the boat hull contour so that pressures exerted thereby are distributed over the hull, and localized stress is avoided. Such boat supporting members include roller elements, being often secured to a cross bar structure mounted on the trailer frame. In addition to roller elements, modern boat trailer design has included a series of hull support wheels mounted for rotation on individual axles formed as part of a cradle configuration of hull support wheels.

Chambers, et al., U.S. Pat. No. 4,464,092, show boat roller wheels where a roller wheel support arm assembly pivots to meet hull conformation. Chambers uses a plurality of axle washers and outer transverse axle pins to hold a wheel to an axle. The Chambers axle pins limit the longitudinal movement of a wheel along an axle spindle to a limited tolerance of "play". Johnson, U.S. Pat. No. 4,881,515, also shows a pivoting roller support arm. Johnson shows a roller wheel quick mount and disassembly. He incorporates an inner axle washer butting against a shoulder on the axle spindle, and an outer end clip ring retainer, i.e., retention ring, for attaching each roller wheel to its axle spindle. Here Johnson does not address the amount of "play" he permits in his wheel mounting, but generally illustrates no longitudinal "play" with his metal retention clip and his axle washer tight against his plastic wheel hub.

The ease of mounting and replacing hull support roller wheels on boat trailers has been a design consideration, as these rollers are often "wear parts". The mounting and design of boat trailer support roller wheels and the roller wheel configuration has been the focus of much attention. The mounting for movement of a wheel on an axle has provided a number of designs even beyond those specific to boat hull support roller wheels.

Ewald, U.S. Pat. No. 1,011,334, shows a two-piece sleeve bushing assembly for mounting a wheel to an axle. Outer and inner sleeves fit into each other and are held together with an annular end cap, which carries screw threads for mating with the end of the outer sleeve. Sawdon, et al. U.S. Pat. No. 219,413 also uses a hub to hold a wheel on an axle spindle. An inboard setscrew binds the wheel to the axle. An outboard threaded cap screws onto the threaded outer end of the Sawdon wheel hub and is fixed with its own setscrew.

Hartung, U.S. Pat. No. 966,331, shows a closed end axle box for mounting a wheel to a tapered axle. The axle box is held in place with an inboard axle cap screwed into engagement with the inboard end of the axle box. This cap is in turn held fast to the axle with a transverse cotter pin.

The boat trailer hull conformation by adjusting the roller wheels, in some instances, has been achieved, by the gimbaling or articulating of the hull support wheels. This roller wheel rocker motion is usually accomplished with a rocker-style bushing. Johnson, U.S. Pat. No. 4,196,502, show two variations of a rounded bushing assembly, which engages his axle shaft. Johnson uses a retention clip ring on his outboard end of axle spindle and a retention ring or retention washer on the inboard end of his axle spindle, similar to his previous patent. Unlike the wheel mounts discussed above, however, these two gimbaled Johnson wheel mounts permit the wheel to move longitudinally along the axle spindle a certain distance. This shifting of the Johnson wheel along his axle spindle can create friction and wear, which in turn can accelerate the need for wheel and/or axle spindle replacement or repair.

Buchanan, U.S. Pat. No. 4,603,459, shows a further wheel mount in which an inner and outer sleeve slide into one another, with each sleeve having a radially projecting annular stop flange. Buchanan mounts his wheel roller material directly to his outer sleeve so that when the wheel is assembled the sleeves form the hub for the wheel. The inner sleeve flange forms a stop against a tapered inboard shoulder on the axle spindle. Buchanan, likewise permits longitudinal movement of his wheel along his axle spindle which accelerates wear.

Godbersen, U.S. Pat. No. 5,024,312, combines gimble (articulation) with an axle spindle end cap, which acts as a gimbal bushing. The Godbersen end cap has a barrel-shaped rocker section with abutment points on either end. This rocker section rides within the inside of the wheel hub. This end cap is held fixed to the outer end of his axle spindle with a retention clip and longitudinal movement is permitted which causes the adjacent shoulder of his rocker section to abut the wheel hub. Diametrically opposed axle projections keep the wheel from migrating too far inboard on the axle spindle.

Boat trailer roller wheels have benefited from axle end caps, which are used to hold a wheel from coming off an axle. Depending upon design, these end caps can also reduce the amount of dirt, which accumulates on the wheel bushing or bearing. End caps have taken various forms as those discussed above. An end cap can also be incorporated as part of a wheel bushing structure. Kapp, U.S. Pat. No. 2,717,807, shows a combination bushing and end cap. A cylindrical sleeve bushing slides over the spindle end of a wheel axle and is secured at a location on the inside of the wheel with an axle set screw. The Kapp sleeve bushing end cap acts as a wheel mounting keeper cap to abut the wheel hub to keep the wheel on its axle.

As boat trailer appearance has become more important, manufacturers have begun to place various insignia, such as emblems and product designations, on various boat trailer structural members. One readily acceptable mounting position for these insignia has been wheel hubs. In so doing, separate wheel hubs or hubcaps have been employed.

What is desired is a boat trailer hull support wheel hubcap for carrying an insignia.

What is secondly desired is such an insignia carrying wheel hubcap, which is incorporated as a part of a wheel bushing.

What is also desired is such a wheel bushing, which holds the wheel on the axle spindle and which is fixed to the axle spindle in a predetermined orientation.

What is further desired is such a wheel bushing that is easily mounted on the axle and easily removed from the axle.

SUMMARY OF THE INVENTION

These objectives of the present invention are realized in a boat trailer, hull support, roller wheel mounting system that relies upon an oriented roller wheel bushing. The system includes a roller support arm for each wheel, which support arm acts as the axle for mounting a respective wheel. Each roller support arm is shaped to include a predetermined rotational position index. The bushing is fitted on the end of each support arm, and has an outside cylindrical wall on which a wheel hub is mounted for rotation. The inside bore of each bushing is shaped to match the indexing of the support arm. Each oriented bushing has a closed end, which fixes the extension of the bushing on a support arm, when installed on the end thereof.

The oriented indexed bushing includes a closed end cap formed by an annular projection. The inboard face of the bushing end cap projection retains the wheel on the bushing and acts as a longitudinal thrust surface against which the wheel hub acts.

A quick release retainer ring fixes the bushing on the support arm. This retainer ring also acts as the inboard longitudinal position stop for the wheel as the wheel hub can butt against it when the wheel moves inwardly on the bushing. With a bushing installed on a support arm, the mating indexing structure between the support arm and the bushing, acts against the rotational thrust imparted to the bushing and thereby relieves the retainer ring from being subjected to any rotational thrust. This rotational thrust can be quite large when a wheel is caused to rotate under a heavy load. Removing it (rotational thrust) from the retainer ring, permits a smaller ring to be used, or when a larger ring is use, permits an extended life for that retainer ring.

The fixed and predetermined positive orientation of the bushing with respect to the support arm establishes a predetermined orientation of the end cap when the system is assembled. This permits an insignia to be placed on the outside face of the end cap with assurance that it will always have a predetermined orientation, the insignia when the system is assembled and a wheel rotates.

BRIEF DESCRIPTION OF THE DRAWINGS

The features, advantage and operation of the present invention will become readily apparent and further understood from a reading of the following detailed description with the accompanying drawings, in which like numerals refer to like elements, and in which:

FIG. 7 is a plan view of the wheel mounting portion end of an index support arm;

FIG. 8 is an end view of the wheel mounting end of the support arm of FIG. 7;

FIG. 9 is a plan view of the wheel mounting portion end of an index support arm with an alternate style indexing;

FIG. 10 is an end view of the support arm of FIG. 9;

DETAILED DESCRIPTION OF THE INVENTION

The present invention is a fixed orientation wheel mounting system for a boat trailer hull support roller wheel assembly. In so doing, the invention assures that indicia carried on the invention will always have a proper orientation. Further, the invention removes the rotational thrust normally applied to a lesser strength keeper member and applies it to a more structurally strong support arm member.

Figure 1:
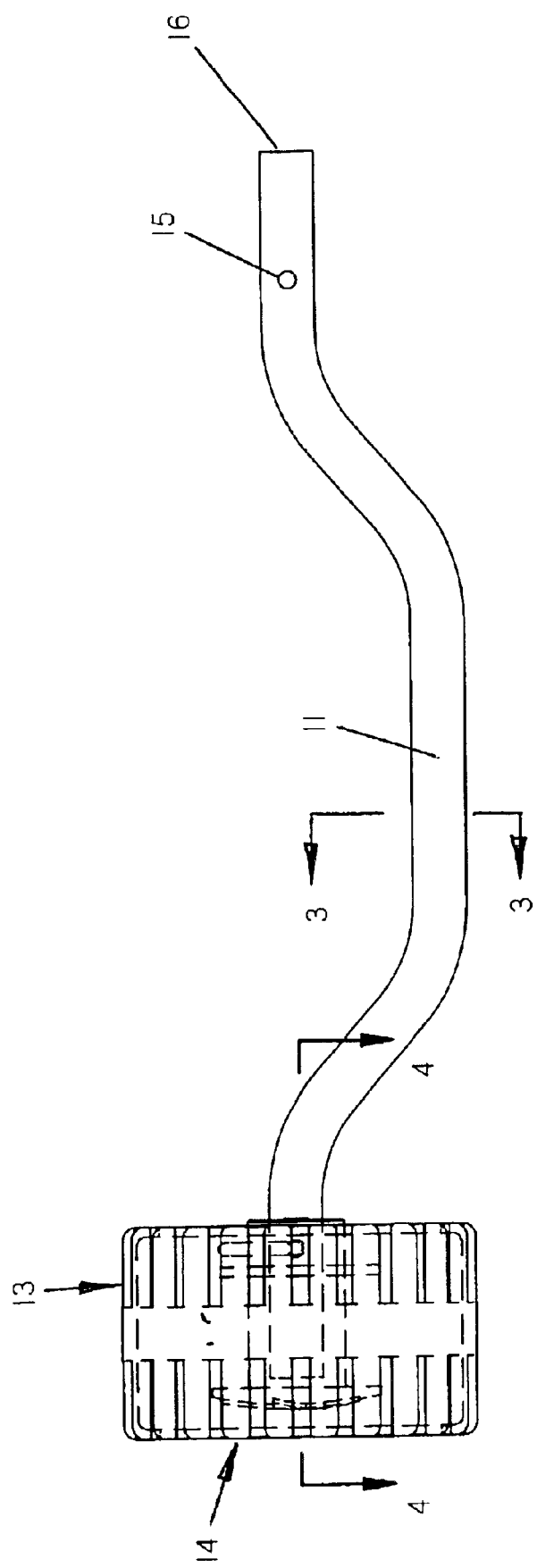
FIG. 1 is a plan view of a support arm with one roller wheel mounted on one end.

FIG. 1 shows a plan view of a support arm 11 that is used as an axle member to support each roller wheel 13. A wheel 13 is mounted to a first end 14 of the support arm 11. Shown in phantom at the first end 14 is the closed cap end of a wheel bushing which will be discussed below. Shown at the opposite second end 16 of the support arm 11 is a through-hole for receiving and holding a keeper retainer ring which will be discussed below. Each end 14, 16 of the support arm 11 is symmetrical, whereby a similar through-hole 15 extends through the first end 14 of the support arm 11.

Figure 2:
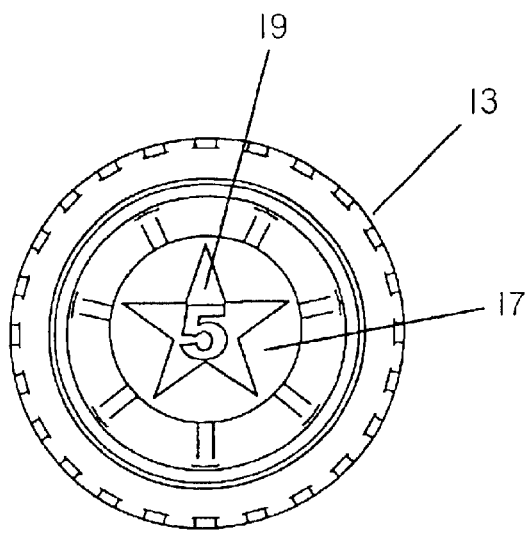
FIG. 2 is an outside end view of the roller wheel of FIG. 1 showing the properly oriented indicia.
Figure 3:
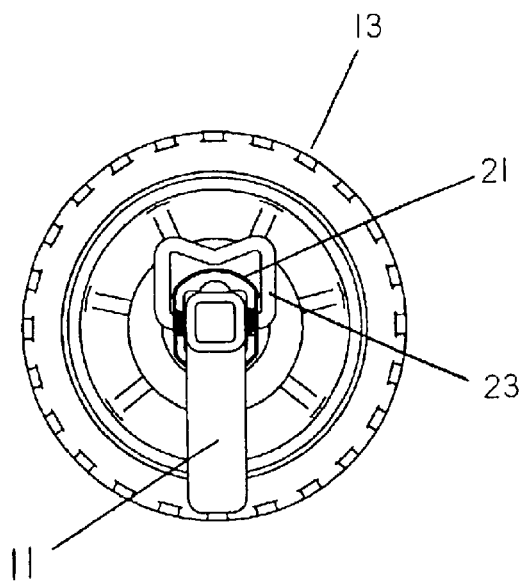
FIG. 3 is an inboard view of the roller wheel on the support arm taken as seen in FIG. 1.

The wheel 13 is shown in a side or outside end view in FIG. 2. Also shown is the end cap 17 of the wheel bushing, which end cap 17 carries a properly oriented indicia 19. FIG. 3, which is the inboard partial sectional view of this assembly, shows the wheel 13 mounted on the end of the support arm 11, to ride on a wheel bushing 21, which in turn is secured to the support arm 11 by a keeper retainer ring 23 extending through the wall of the bushing 17 to engage the through-hole 15, not seen in this figure.

Figure 4:
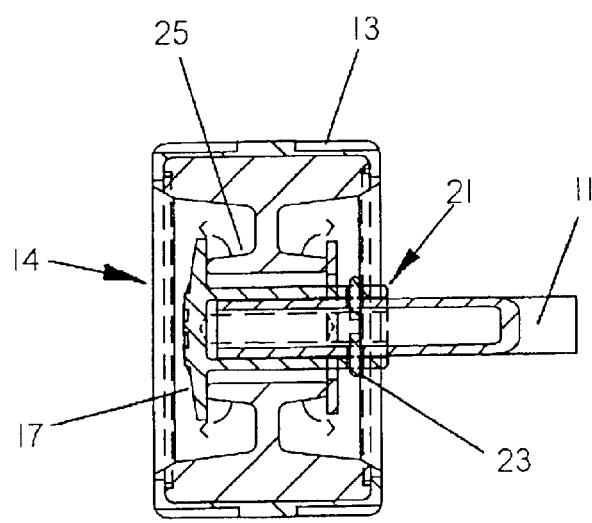
FIG. 4 is a partial cross section of the wheel, bushing and spring clip taken as seen in FIG. 1.

A partial cross sectional view of the wheel mounting system assembly, is shown in FIG. 4. The cylindrical outer walled bushing 21 is fully inserted onto the end 14 of the support arm 11. The outer end of the bushing 21 is closed of and includes an annular projection, which forms the end cap 17. The hub 25 of the wheel 13 can seat to thrust against the protruding end cap 17. Thereby, this end cap 17 projection surface provides a longitudinal thrust surface against which the wheel hub 25 operates as it is moved longitudinally outwardly on the bushing 21. This end cap 17 therefore, also acts as the outboard retainer structure for holding the wheel 13 on the support arm 11.

The retainer ring 23 besides acting to hold the bushing 21 on the support arm 11 also acts as the inboard longitudinal position stop for the wheel 13. When the bore of the bushing 21 is in a tight friction "fit" with the spindle or end 14 of the support arm 11, that friction fit assumes most of the longitudinal thrust on the bushing 21 body created by the longitudinal thrust on the bushing end cap 17. This alleviates that component of longitudinal thrust, which would be taken up by the retainer ring 23.

Figure 6:
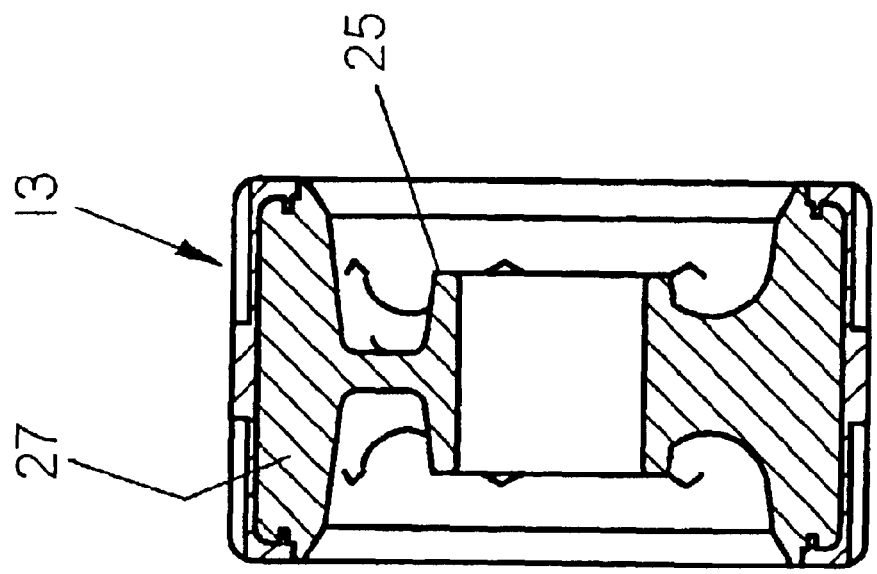
FIG. 6 is a cross sectional view of the wheel taken as seen in FIG. 5.
Figure 5:
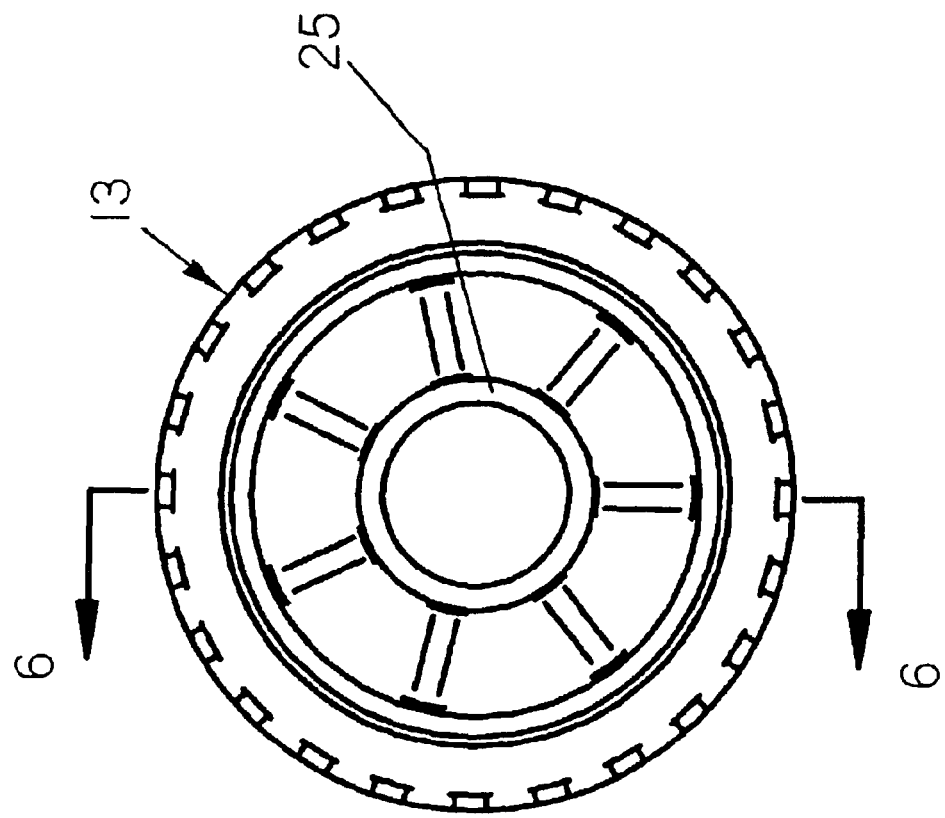
FIG. 5 is a side view of a roller wheel.

A side view of the wheel 13 is shown in FIG. 5, with a cross section of this wheel 13 shown in FIG. 6. The wheel hub 25 can be made as a contiguous part of its tread portion 27, or can be made as a separate structure with a ring of tread material fitted to the outer side of the hub 25. Likewise, the hub 25 can be made of rubber, plastic or metal materials. Often the hubs are made of polymeric materials.

The support arm 11 is seen in a partial plan view in FIG. 7, with the through-hole, i.e., the retaining ring 23 receiving hole 15 positioned inboard from the end of the arm 11 at a location to secure the bushing 21 to the arm 11. The arm 11 has an irregular cross sectional shape seen illustrated in the end view of the arm 11, FIG. 8. A first sidewall 29 of this arm 11 is straight, while the opposite sidewall 31 has its outer face curved. The arm 11 is made from a tube, so that it has a wall thickness sufficient for its structural design purposes. The fundamental shape of the tube opening 35, which establishes the tubes ultimate cross sectional shape, is essentially rectangular. Alternatively, it can be square, or any other shape acceptable and convenient for mounting the arm 11 on the boat trailer support mounts or cross rails or other structure receiving structure.

FIGS. 9 and 10 show an alternate support arm 11a. This support arm 11a is a solid bar with a regular cross section, where sidewall opposing face 29a and 31a is identical. A rectangular keyway 35 extends along the top surface of the arm 11a.

The cross sectional shape of each of the respective embodiments for the support arm 11, 11a, define an indexed position for mounting the bushing 21 in a fixed orientation, when the bore of the bushing 21 is shaped to mate with the respective support arm 11, 11a.

Figure 12:
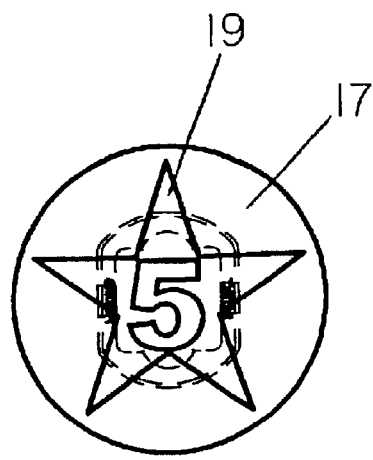
FIG. 12 is an end cap end view of the wheel bushing of FIG. 11.
Figure 11:
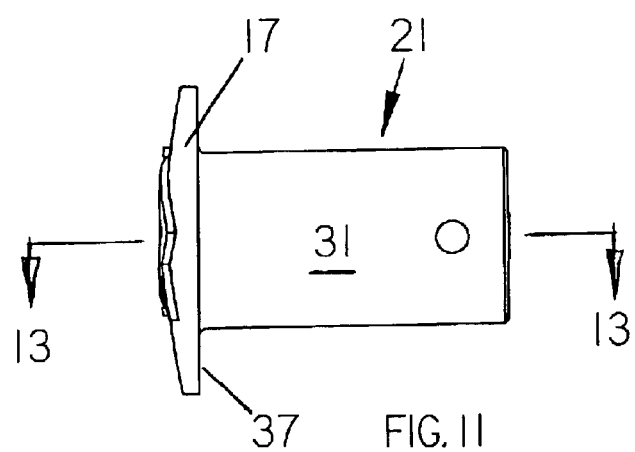
FIG. 11 is a plan view of the indexed wheel bushing.
Figure 13:
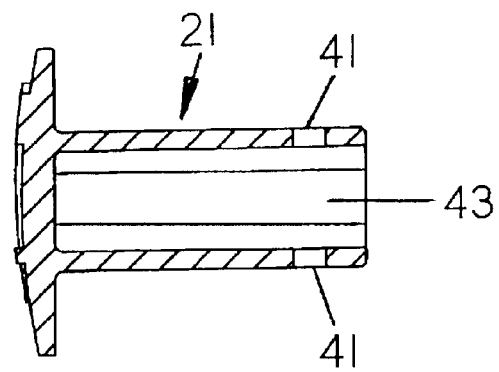
FIG. 13 is a cross sectional view of the wheel bushing taken as shown in FIG. 11.

The bushing 21 is shown in FIGS. 11, 12, and 13. FIG. 11 is a side view of the bushing 21 in which the round, or domed, end cap 17 carries the indicia 19 on its outer face. The annular projection of the end cap 17 beyond the outside wall 37 of the bushing provides the longitudinal thrust surface 39 on its inward face to provide the annular projecting thrust surface 39, which faces the hub 25 of a wheel 13.

A retaining hole 41 extends diametrically through the bushing 21 and receives the retaining ring 23 to be held to the support arm 11. The bushing retaining hole 41 is positioned with respect to the support arm 11 through-hole 15, and with respect to the indexing shape of the bushing's bore 43, to be in alignment when the bushing 21 is fully inserted on the support arm 11.

Figure 15:
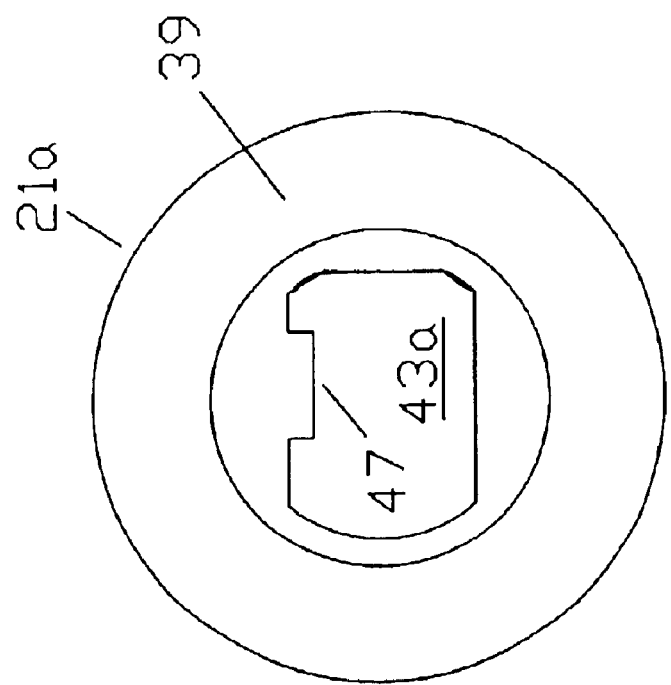
FIG. 15 shows the support arm end of the bushing with an internal bore shape to mate with the support arm index shape of FIGS. 9–10.
Figure 14:
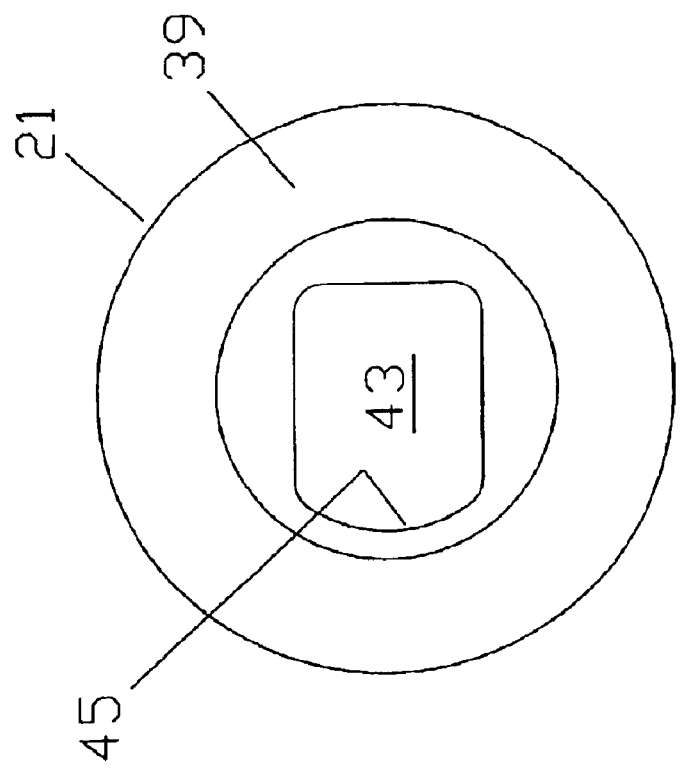
FIG. 14 shows the support arm end of the bushing with an internal bore shape to mate with the support arm index shape of FIGS. 7–8.

The bushing bore 43 open end of the respective bushings 21 and 21a are respectively shown in FIGS. 14 and 15. The support arm embodiment 11 of FIG. 8 can mate with the bushing embodiment 21 of FIG. 14. The support arm embodiment 11a of FIG. 10 can mate with the busing embodiment 21a of FIG. 15.

A bushing 21, 21a, can be installed on a mating support arm 11, 11a in only one position of rotation. This provides a positive indexing to a fixed rotational position of a bushing on a support arm. Thereby, having its position predetermined, the indicia 19 can be applied to the outside face of the end cap 17 with an assurance that its mounted orientation is predetermined and fixed.

The bore openings 43, 43a of each bushing 21, 21a are shaped to the cross sectional shape of the respective arms 11, 11a. A curved recession 45 in the bore 43 accommodates the curved wall 31 or the support arm 11. This shape operates as a key in a keyway to fix the position of the bushing 21 on the support arm 11. Similarly, the rectangular projection 47 in the bore 43a of bushing 21a mates with the keyway 35 of the support arm 11a, to similarly fix the position of the bushing 21a on the support arm 11a.

The bushing, its end cap, and the indicia are made as a single piece structure. Or the indicia can be added after the bushing and end cap are made as a single piece structure. Typically, the bushing is made of similar hardness material or softer material than a wheel hub. If the bushing and hub are of similar hardness, they will wear equally. If one is made softer, that softer part becomes a replaceable wear part. Typically, a bushing is made of thermo-plastic material such as a commercially available TSP (thermo-setting plastic) material. Moreover, as rotational thrust is imparted to the bushing, that force is taken up by the keyway and otherwise irregular cross sectional shape of the support arm and mating bushing bore shape. The retainer ring is spared any rotational thrust forces.

The indexing shape of the support arm and mating bushing can be varied to include toothed shapes with fixed indexing, other shapes for keyways, and other cross sectional shapes. The shapes describe above and shown in the accompanying drawings are easily manufactured and such manufacturing costs are less than with other shapes and keyway configurations. The invention provides an indexing structure formed into an outer portion of the support arm and a conforming indexing structure formed within the bushing which mates with the support arm for fixing the orientation of the bushing on the support arm. The bushing end cap's radial projection beyond the bearing surface of the bushing provides a keeper structure which also absorbs the outwardly directed longitudinal thrust forces.

While the eccentric curved convex projection of the support arm is used as an indexing structure, this shape can be varied and still perform the same functions. Likewise, the mating concave eccentric shape of the bushing's bore will change.

Many changes can be made in the above-described invention without departing from the intent and scope thereof. It is therefore intended that the above description be read in the illustrative sense and not in the limiting sense. Substitutions and changes can be made while still being with the scope of the appended claims.

What is claimed is:

1. A roller wheel support assembly for a boat trailer, comprising:
    a wheel support arm for connection to said boat trailer;
    a bushing for mounting an the end of said support arm;
    an orienting structure formed into a outer portion of said support arm;
    a conforming orienting structure within said bushing which mates with said support arm orienting structure for fixing orientation of said bushing on said support arm; and
    a retainer structure for retaining said bushing on said support arm once said bushing is in said mounted orientation on said support arm.

2. The assembly of claim 1, wherein said bushing includes a closed outer end for establishing the distance said bushing is mounted on said support arm.

3. The assembly of claim 2 wherein said bushing includes an integral end cap formed on said closed outer end of said bushing, said end cap having a radial projection beyond the bearing surface of said bushing, and wherein said fixed orientation of said bushing on said support arm is predetermined by said support arm and said bushing orienting structures.

4. The assembly of claim 3 also including a wheel mounted on said bushing wherein said retainer structure also holds the wheel on the inboard side thereof, and wherein said end cap radial projection forms a longitudinal thrust surface for the outboard side of said wheel.

5. The assembly of claim 4 wherein said orienting structure in the outer portion of said support arm is an eccentric curved convex projection of a portion of the wall of said support arm.

6. The assembly of claim 5 wherein said bushing has a central bore shaped to fit tightly on said support arm and wherein said conforming orienting structure is a eccentric curved concave indentation of a portion of said central bore.

7. The assembly of claim 6 also including a though-hole extending transversely though said support arm and a matching through-hole extending transversely through said bushing, said support arm hole and said bushing hole being in alignment when said bushing is fully mounted on said support aim.

8. The assembly of claim 7 wherein said retainer structure includes a retainer ring extending through said bushing hole and said support arm hole.

9. The assembly of claim 8 also including indicia on the outside face of said bushing end cap.

10. The assembly of claim 4 wherein said orienting structure in the outer portion of said support arm is a keyway in a portion of the wall of said support arm.

11. The assembly of claim 10 wherein said bushing has a central bore shaped to fit tightly on said support arm and wherein said conforming orienting structure is a key structure in a portion of said central bore.

12. The assembly of claim 11 also including a though-hole extending transversely though said support arm and a matching through-hole extending transversely through said bushing, said support arm hole and said bushing hole being in alignment when said bushing is fully mounted on said support arm.

13. The assembly of claim 12 also including a retainer ring extending through said bushing hole and said support aim hole.

14. The assembly of claim 11 also including indicia on the outside face of said bushing end cap.

15. A roller wheel support assembly for a boat trailer for carrying an indicia in fixed orientation while said wheel turns, comprising:
   a wheel support arm for connection to said boat trailer;
   a bushing for mounting on the end of said support arm;
   an orienting and fixing structure on an outer portion of said support arm;
   a complementary orienting and fixing structure on an inner portion of said bushing, wherein said support arm and bushing orienting and fixing structures mate and fix a predetermined orientation of said bushing with respect to said support arm; and
   an indicia mountable to said bushing;
   wherein said bushing includes an end cap suitable for carrying said indicia thereon.

16. The roller wheel support assembly of claim 15, also including a wheel mounted on said bushing for rotation thereon.

17. A roller wheel support assembly for a boat trailer having a retainer for holding said wheel on a wheel support arm while reducing the forces on said retainer, comprising:
   a wheel support arm for connection to said boat trailer, said support arm having a retainer connection structure:
   a bushing mountable onto said wheel support arm, said bushing being capable for supporting a wheel for rotation thereon by the hub of said wheel;
   a retainer positioned at the inboard end of said bushing for maintaining said bushing on said wheel support arm; and
   an end cap on the outboard end of said bushing, said end cap having an annular projection protruding transversely, wherein said projection provides a longitudinal thrust surface against which said wheel hub operates when in contact therewith, said thrust surface thereby reducing the longitudinal forces on said retainer.

18. The roller wheel assembly of claim 17, also including a fixed orientation structure in the inner portion of said bushing, and including a mating orientation structure in the outer portion of said wheel support arm, said two orientation structures acting to absorb the rotational thrust forces created by a rotating wheel mounted on said bushing thereby reducing the rotational thrust forced an said retainer.

* * * * *

UNITED STATES PATENT AND TRADEMARK OFFICE
CERTIFICATE OF CORRECTION

PATENT NO.    : 6,802,570 B2
DATED         : October 12, 2004
INVENTOR(S)   : Gary M. McPherson et al.

It is certified that error appears in the above-identified patent and that said Letters Patent is hereby corrected as shown below:

Column 4,
Line 23, insert -- 15 -- after "hole";

Column 5,
Line 42, replace "busing" with -- bushing --;

Column 6,
Line 11, replace "describe" with -- described --;
Line 31, replace "with" with -- within --;
Line 37, replace "an" with -- on --;
Line 42, insert -- the -- between "fixing" and "orientation";

Column 7,
Lines 3, 4 and 21, "though-hole" with -- through-hole --;
Lines 8 and 29, replace "aim" with -- arm --;
Line 22, replace "though" with -- through --;

Column 8,
Line 37, replace "an" with -- on --.

Signed and Sealed this

First Day of February, 2005

JON W. DUDAS
*Director of the United States Patent and Trademark Office*